United States Patent [19]

Koegl et al.

[11] Patent Number: 5,059,761
[45] Date of Patent: Oct. 22, 1991

[54] INDUCTIVE DEPTH SENSING AND CONTROLLING METHOD AND SYSTEM FOR LASER DRILLING

[75] Inventors: Rudolph A. A. Koegl, Niskayuna; Richard A. Hogle; Susan D. Bauer, both of Schenectady, all of N.Y.

[73] Assignee: General Electric Company, Schenectady, N.Y.

[21] Appl. No.: 631,839

[22] Filed: Dec. 21, 1990

[51] Int. Cl.⁵ .................................................. B23K 26/02
[52] U.S. Cl. ............................. 219/121.83; 219/121.62
[58] Field of Search ....................... 219/121.83, 121.62

[56] References Cited

U.S. PATENT DOCUMENTS

| | | | |
|---|---|---|---|
| 3,700,850 | 10/1972 | Lumley et al. | 219/121.69 |
| 4,473,737 | 9/1984 | Anthony | 219/121.71 |
| 4,504,727 | 3/1985 | Melcher et al. | 219/121.62 |
| 4,608,480 | 8/1986 | Bizot et al. | 219/121.7 |
| 4,689,467 | 8/1987 | Inoue | 219/121.6 |
| 4,764,655 | 8/1988 | Ortiz, Jr. et al. | 219/121.83 |
| 4,789,770 | 12/1988 | Kasner et al. | 219/121.7 |
| 4,818,841 | 4/1989 | Sliva et al. | 219/121.83 |
| 5,013,886 | 5/1971 | Koegl et al. | 219/121.83 |

Primary Examiner—C. L. Albritton
Attorney, Agent, or Firm—Paul R. Webb, II; James C. Davis, Jr.

[57] ABSTRACT

Laser drilling and real-time sensing and control of hole depth by the provision of magnetic field jack-up coils located around or to the side of a laser beam, in a stream of ionized plasma, and the coils are connected to a depth detector and comparator to halt laser drilling at a desired depth.

20 Claims, 5 Drawing Sheets

INDUCTIVE DEPTH SENSING AND CONTROLLING METHOD AND SYSTEM FOR LASER DRILLING

BACKGROUND OF THE INVENTION

This invention relates to a method and system for real-time sensing of hole depth when a laser beam is drilling the surface of a workpiece. More specifically, this invention relates to depth sensing by sensing the magnetic field from ionized plasma caused by the laser beam hitting the workpiece.

Lasers are sometimes used for drilling holes in various parts. When using a high-power laser beam to drill a hole in a workpiece, it is useful to know the depth of the hole. Further, the real-time control of hole depth would be advantageous.

Various arrangements have been used for the different types of sensing of holes in laser drilling. Among those are arrangements which detect when a laser has broken through a wall of a workpiece. Phototransistor-type detectors rely upon having the detectors oriented towards the backside (i.e., side opposite the drill side upon which the laser beam is directed) of the workpiece. When the breakthrough occurs, the detectors sense the light and provide a signal indicating that breakthrough has occurred.

Among prior patents related to the laser drilling or laser machining of workpieces such as machine parts in U.S. Pat. No. 4,608,480, issued Aug. 26, 1986, to Bizot et al. That patent discloses control of the operating parameters of a laser by sensing the sounds emitted by the melting of the workpiece.

U.S. Pat. No. 4,504,727, issued Mar. 12, 1985, to Melcher et al. discloses a laser drilling system having feedback control based upon sensing an acoustic signal arising from subjecting the workpiece to a laser.

The Kasner et al. U.S. Pat. No. 4,789,770, issued Dec. 6, 1988, shows an arrangement for controlling depth in a laser drilling system. An optical sensing arrangement is used to detect the depth of the hole which is drilled.

The Inoue U.S. Pat. No. 4,689,467, issued Aug. 25, 1987, shows a laser machining apparatus where a source of plasma is used in combination with the laser. Additionally, infrared rays radiated from the workpiece may be sensed in order to automatically adjust the laser beam.

The Ortiz, Jr. et al. U.S. Pat. No. 4,764,655, issued Aug. 16, 1988, shows a laser materials processing system including an arrangement to determine the beam diameter by imaging techniques.

The Anthony U.S. Pat. No. 4,473,737, issued Sept. 5, 1984, shows a laser drilling technique whereby holes are drilled in a transparent or substantially transparent material (i.e., transparent to the laser radiation) with the hole starting on the side of the workpiece or machine part opposite the side on which the laser beam impinges.

R. Koegl and R. Hogle, co-inventors of the present application, were inventors of U.S. application Ser. No. 07/556,678, filed July 23, 1990 and entitled "Real-Time Magnetic-Flux Breakthrough Detection Method and System for Laser Drilling", assigned to the assignee of the present application, and hereby incorporated by reference. That application disclosed an inductive sensing arrangement for detecting when a laser beam has drilled a hole completely through a wall of a workpiece.

Although various known techniques for controlling laser machining processes have been useful, they have often been subject to one or more of several disadvantages, such as inaccuracy, high cost and complexity. Those techniques which provide for breakthrough detection are useful in some applications, but are of little value in applications where one wants to control the depth of a hole which does not go completely through a wall of a workpiece or machine part. Those techniques which use optical sensing of the drilling operation from the front or drill side of a workpiece may fail to operate properly because of the various debris which is sprayed outwardly on the drill or front side of the workpiece.

OBJECTS AND SUMMARY OF THE INVENTION

Accordingly, it is a primary object of the present invention to provide a new and improved method and apparatus for sensing the depth of a hole during laser drilling.

A further object of the present invention is to provide real-time control of the depth of a hole which is being drilled by a laser beam.

A further object of the present invention is to provide depth sensing which is relatively accurate and is relatively low in cost.

A still further object of the present invention is to provide a method and system of laser drilling with real-time sensing and control of hole depth.

The above and other objects of the present invention which will become more apparent when the accompanying drawings are read in conjunction with the detailed description are realized by a method of applying a laser beam to a workpiece including the step of placing at least one magnetic field pick-up coil adjacent to a surface on a front of a workpiece. A laser beam is then applied to an application point on the surface to drill a hole in the surface, the laser beam causing a magnetic field in an ionized plasma of particles escaping from the surface. The magnetic field is sensed, by use of the coil. A depth signal is generated representative of the depth of the hole as it is being drilled, the depth signal being dependent on the sensing of the magnetic field. The coil may be placed such that it extends completely around the laser beam and in a stream of ionized plasma of particles (i.e., in the stream when the laser beam is on). Alternatively, the coil may be placed to one side of the laser beam and in a stream of the ionized plasma of particles. Two or more magnetic field pick-up coils could be used for sensing the magnetic field.

The depth of the hole as determined from the depth signal is compared to a desired depth. Upon the hole reaching the desired depth, the drilling of the hole is automatically halted. The comparing step may be accomplished by a comparator or by a microprocessor.

The method may further include the generating of plasma level signal dependent on the sensed magnetic field. The depth signal then depends on the plasma level signal taken over time. More specifically, and preferably, the depth signal depends on the plasma level signal integrated over time.

The depth signal is generated by a memory having a look up table, the memory being addressed based upon a value of the plasma level signal integrated over time.

The system of the present invention is a system for use when applying a laser beam to a workpiece. The system includes at least one magnetic field pick-up coil for sensing a magnetic field in an ionized plasma of particles escaping from a workpiece being drilled by a laser beam. Additionally, the system includes a depth detector connected to the coil and including means to generate a depth signal representative of the depth of a hole as it is being drilled by a laser, the depth signal being dependent on sensing of magnetic field by the magnetic field pick-up coil. The system may further comprise a laser for applying a laser beam to a drill side of a workpiece, and wherein the magnetic field pick-up coil senses the magnetic field when disposed on a drill side of a workpiece. The system may have two magnetic field pick-up coils connected to the depth detector.

The depth detector includes a comparison means for comparing the depth of the hole being drilled with a desired depth. The system further includes means, responsive to the comparison means, to automatically halt drilling of the hole when the hole reaches the desired depth. The depth detector generates a plasma level signal and the means to generate the depth signal includes an integrator to integrate the plasma level signal over time, the depth signal being dependent on the time integral of the plasma level signal. The means to generate the depth signal further includes a memory with a look up table.

As will be readily appreciated by those familiar with laser machining processes, the workpiece 12 should be metal, ceramic, or some other material which will generate an ionized plasma of particles upon being struck by a laser beam.

BRIEF DESCRIPTION OF THE DRAWINGS

The above and other features of the present invention will be more readily understood when the following detailed description is considered in conjunction with the accompanying drawings wherein like characters represent like parts throughout the several views in which.

DETAILED DESCRIPTION

Figure 1:
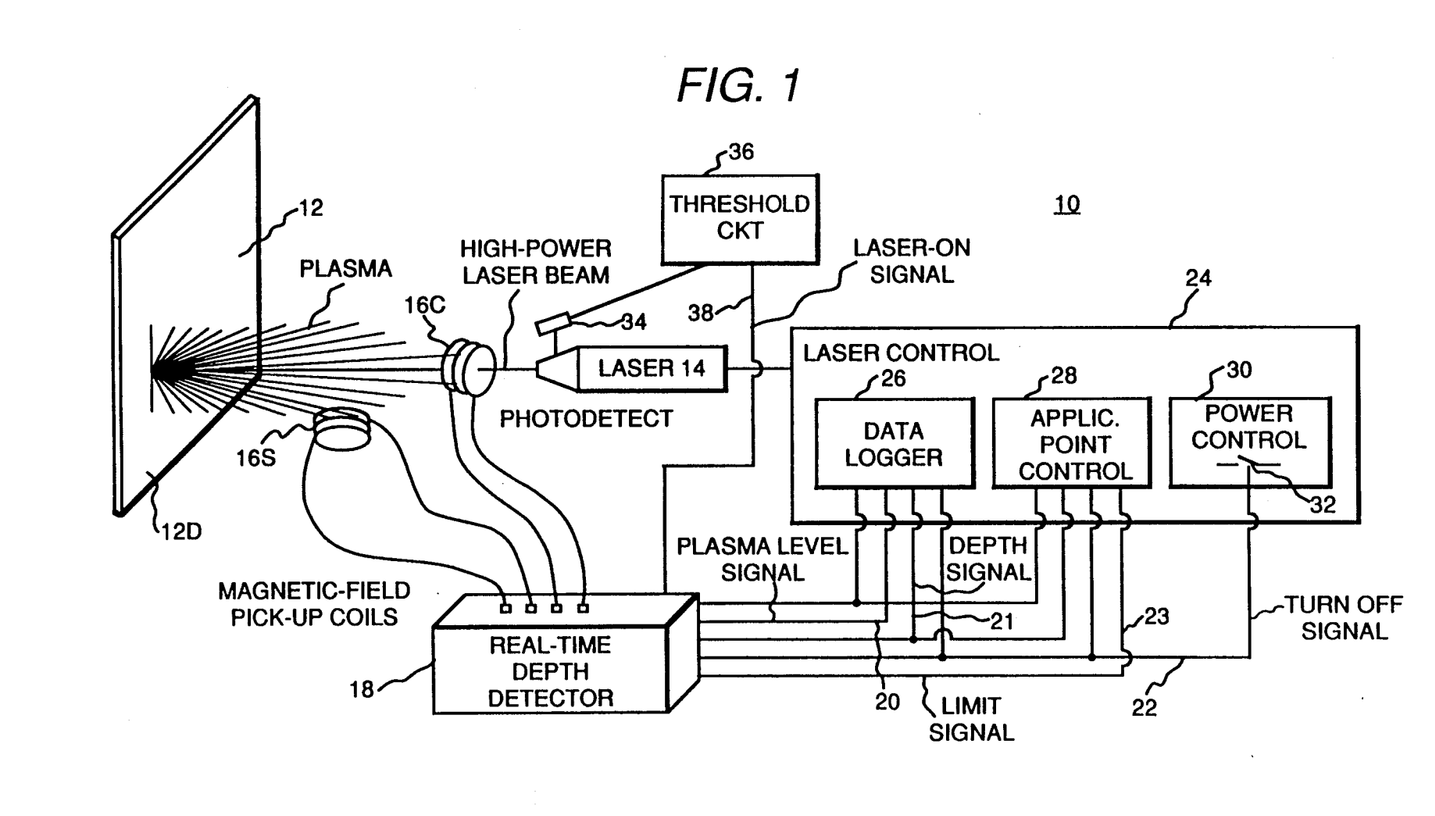
FIG. 1 is a schematic of an overall system according to the present invention.

The system 10 of FIG. 1 is applying a high-power laser beam to a part or workpiece 12 which is to be drilled. The machine part or workpiece 12 has been shown as a flat piece for ease of illustration, but the invention can control the laser drilling of a hole in a cylinder or other complex shape. It will be apparent from FIG. 1, that all of the components of the system 10 are located on the front or drill side 12D of the workpiece 12.

The system 10 includes a laser 14, which may be a continuous laser or a pulse-type laser. Any of various types of high-power lasers could be used.

Before discussing further components of the system 10, it will be useful to discuss what occurs when the illustrated high-power laser beam from laser 14 strikes an application point on the front side or surface 12D of the workpiece 12. The laser energy acting on the surface causes portions of the surface to melt and vaporize. Transient magnetic fields are generated in an ionized plasma of particles escaping from the drill location. By sensing these magnetic fields, the present invention senses the amount of material which has vaporized and indirectly senses the hole depth.

The present invention detects the plasma-induced magnetic fields by using at least one magnetic field pick-up coil. Preferably, two coils 16C and 16S would be used. A coaxial coil 16C would be disposed such that it extends completely around the laser beam from laser 14, whereas a side coil 16S is disposed to the side of the laser beam as illustrated. When the beam from laser 14 first strikes the surface, the plasma is rather broadly dispersed or spread out over a wide angle and one or more coils such as 16S may be used to detect the magnetic field associated with the plasma. After the beam from laser 14 has drilled a hole partially through the machine part or workpiece 12, the plasma will have a greater tendency to travel along the axis of the laser beam itself, in which case the concentric coil 16C is best disposed to sense the magnetic field generated in the plasma movement. Depending upon the characteristics of the material making up the workpiece 12, the size and shape of the coil, and the distance between the coil and the surface which is being drilled, a single coil may be sufficient.

Although not illustrated in FIG. 1, the coils 16C and 16S could be mounted to the laser 14 or mounted to a common support structure in any of various ways.

The coils 16C and 16S are illustrated schematically in FIG. 1, but the coils may be encapsulated in a ceramic or other coating or housing to protect the wires of the coil itself from adverse effects caused by the plasma. Such a protective coating (not shown) might be arranged to allow the plasma particles to pass along the axis of symmetry of the coil (the axis of symmetry of coil 16C coincides with the beam from laser 14), or alternately, such a protective coating or housing may completely close off the interior of the coil. In other words, in the first case, the housing would result in a ring-shaped device wherein plasma could pass through the ring, whereas in the second or closed case, the coil and its housing would be plate-shaped. In the closed case wherein the coil is shaped like a plate, the coil would still function to sense magnetic field from plasma passing adjacent to it.

The coils 16C and 16S are connected to a depth detector 18. The detector 18 is real-time, meaning that it is actually detecting hole depth as the hole is drilled. The inner workings of the detector 18 will be discussed in more detail below. However, a broad overview of its operation is useful at this stage. The detector 18 generates a plasma level signal on line 20 when either or both of the coils 16C and 16S have detected the magnetic field associated with the plasma. This signal indicates that drilling is actually underway. Detector 18 generates a depth signal on line 21 which corresponds to the actual depth of the hole in workpiece 12. The detector 18 further generates a turn off signal on line 22 when the hole has been drilled to a desired depth. Optionally, the turn off signal is generated when the beam from laser 14 has broken through the wall or portion of workpiece 12 which is being drilled. The plasma level signal on line 20, the depth signal on line 21, and the turn off signal on line 22 are supplied to a laser control 24 which may include many standard components (not illustrated) for control of the laser 14. Additionally, the laser control 24 may include a data logger 26, an application point control 28, and a power control 30 which merit more detailed discussion.

The data logger 26 may be used to store data corresponding to the plasma level signal on line 20, the depth signal on line 21, and the turn off signal on line 22. The data logger 26 has been shown as part of the laser control 24, but may be considered as a separate component.

The turn off signal on line 22 is also supplied to a power control 30 having a controlled switch 32. The controlled switch 32 is simply a switch which, upon opening, stops the laser 14 from emitting the beam. The switch 32 may simply cut power to the laser 14.

If the system 10 is to be used simply for drilling individual holes within one or more workpieces or machine parts, one would use a switch such as 32 to simply turn off the laser beam upon the hole reaching the desired depth. The laser 14 and/or the workpiece 12 could then be moved so that another hole could be drilled in the same workpiece or a different workpiece. Additionally, the laser control 24 of FIG. 1 also allows the system 10 to be used for cutting a workpiece. If one is trying to very precisely cut a workpiece, the arrangement 10 may, in effect, allow one to drill a series of very closely spaced holes in order to effect the cutting of a groove of precise depth in the workpiece. To that end, a limit signal on line 23 is produced by the detector 18 upon the hole reaching the desired depth. By feeding the limit signal to the application point control 28, the control 28 (which may be a robotic control) may move the laser 14 and/or the workpiece 12 each time the hole reaches the desired depth to cut or drill a groove in the workpiece. The limit signal may also be provided to the data logger 26, although this is not shown.

It is useful to supply the detector 18 with a laser-on signal 38 for reasons discussed in more detail below in conjunction with FIG. 2. The laser-on signal 38 simply tells the detector 18 that the laser 14 is emitting a beam. Such a laser-on signal 38 might simply operate from the laser control 24 by using a pre-existing signal which usually corresponds to operation of the laser. However, FIG. 1 shows an arrangement wherein a photodetector 34 is used to detect the light corresponding to the laser beam from laser 14. Depending upon the sensitivity of the photodetector 34, which may be a phototransistor, photodiode, or any of several kinds of light-sensitive elements it may be sufficient to simply have the photodetector element viewing the beam from laser 14 from the side. Alternatively, one could have a beam-splitter (not shown) wherein a small portion of the beam would be directed right at the photodetector element 34. The photodetector element 34 is connected to a threshold circuit 36 which simply insures that the output of the photodetector element 34 is of sufficient magnitude to indicate that the laser is on. The threshold circuit 36 may simply be a comparator. The output from the threshold circuit 36 is the laser-on signal appearing on line 38. The output of the threshold circuit 36 would be one of two values: a value corresponding to the laser-on signal, and a second value indicating that the laser is not on. Line 38 is connected to the detector 18 so that the detector 18 senses whether the laser 14 is turned on.

Figure 2:
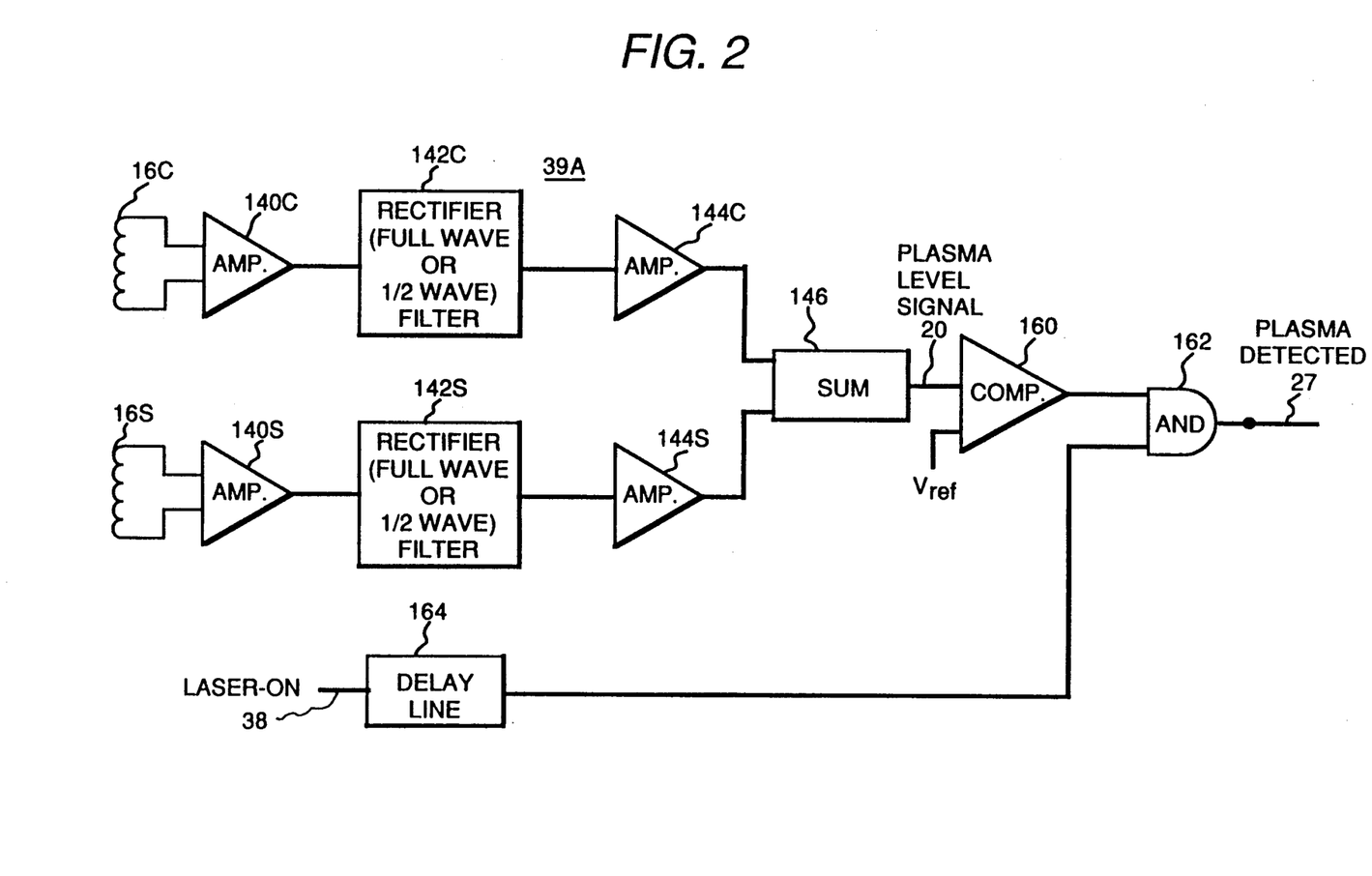
FIG. 2 shows an embodiment of a plasma level circuit which may be used as part of the depth detector in the arrangement of FIG. 1.

With reference now to FIG. 2, a possible circuit for implementing a plasma level generator portion 39A of the detector 18 of FIG. 1 will be discussed. The coil 16C is connected to an instrumentation amplifier 140C, the output of which is a voltage dependent on the magnetic field sensed by coil 16C. The output from amplifier 140C is fed to a rectifier 142C, (preferably full wave, but could be half wave) for rectification purposes. The output of rectifier 142C is fed to amplifier 144C, which may simply be used to provide an appropriate level signal at its output for feeding to a summing circuit 146.

The summing circuit 146 also receives a signal dependent upon the magnetic field sensed by coil 16S, this occurring by way of amplifier 140S, full-wave rectifier 142S, and amplifier 144S, each of which works identically to the corresponding one of components 140C, 142C, and 144C. The output of summing circuit 146 is a plasma level signal which appears on line 20. The output of summing circuit 146 is supplied to a comparator 160 which outputs a signal only if the coils are together picking up enough signal to be greater than a reference voltage.

The output of comparator goes to AND gate 162 which also receives a delayed laser-on signal from delay line 164 such that no plasma detected signal (i.e., output of gate 162) on line 27 can be generated unless the laser has been on for greater than a certain time. This delay time would correspond to the time that it takes from laser on until the magnetic fields are sensed.

The plasma level signal on line 20 is indicative of the plasma at a particular moment. In order to provide an indication of the depth of the hole in the workpiece, the plasma level signal is supplied to a depth signal generator portion 170 (see FIG. 3) of the detector 18. More specifically, the plasma level signal is fed to a high quality analog switch 171, which in turn supplies the signal as an input to integrator 172. The laser-on signal closes switch 171 only when the laser is on. Further, the laser-on signal, by way of inverter 173, closes switch 174 when the laser is off. Components 171, 173, and 174 are used to accurately integrate the plasma level signal.

Figure 3:
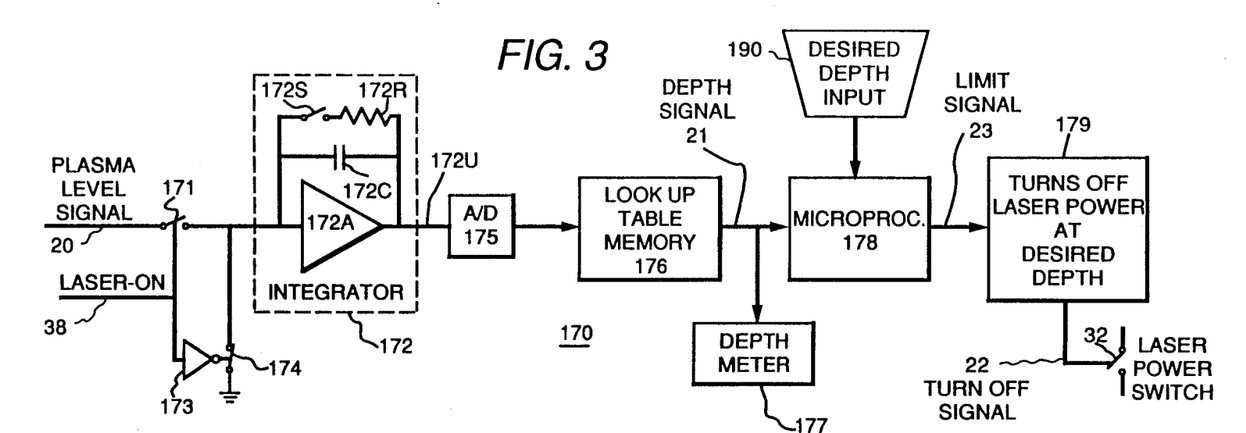
FIG. 3 shows an embodiment of a depth signal generator which may be used as part of the depth detector.

The integrator 172 includes amplifier 172A, capacitor 172C, resistor 172R, and reset switch 172S and integrates using well-known principles. The reset switch 172S may be controlled by an initializing circuit (not shown) of any known type to discharge the capacitor 172C before integration begins.

The output of integrator 172 is supplied on line 172U to an analog to digital converter 175, the output of which is used to address a look up table memory 176. The memory 176, which may be a ROM, PROM, EEPROM, or other memory, has a look up table stored therein. The look up table is empirically determined for a particular material (composition of the workpiece 12), laser type or characteristics, and distance between the coils and the workpiece. The look up table supplies a depth signal (digital word) which has been previously established to correspond to the hole depth for a given integrator output. The look up table provides a means for establishing accurate depth measurements even when a complex relationship exists between the integral of the plasma signal and hole depth.

The desired depth input 190 may be entered via thumb wheel switch, terminal device or other method. The digital depth signal of line 21 is supplied to an optional depth meter 177 as well as a microprocessor 178. The microprocessor 178 compares the depth signal to a desired depth (not shown, value stored in a memory of microprocessor). Upon the hole being drilled to the desired depth, the microprocessor turns off the laser by the limit signal on line 23 as indicated by block 179 shown linked to the laser power switch 32.

Figure 4:
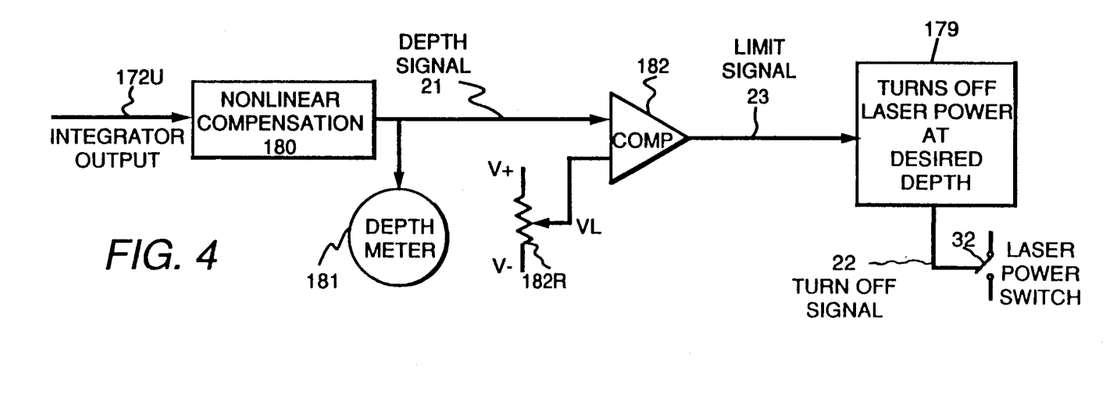
FIG. 4 shows an alternate arrangement for a part of the depth signal generator in FIG. 3.

FIG. 4 shows an alternate arrangement for the components shown to the right of integrator 172. This arrangement uses a nonlinear compensation network 180 (sometimes called a nonlinear function generator) to convert the integrator output on line 172U into an analog depth signal on line 21, the depth signal being a linear function of the hole depth. Compensation network 180 would be established according to an empirically observed relationship between the integrator output and the hole depth. The compensation network could be left out if, for a given material composition of the workpiece, set of laser characteristics, and other conditions, there was a linear relationship between the plasma level integral and the hole depth.

The depth signal on line 21 is supplied to a depth meter 181 and a comparator 182. The comparator 182 compares the actual hole depth corresponding to the depth signal with a desired depth established by an operator adjusting the setting of potentiometer 182R to provide a voltage VL. Upon the depth signal indicating that the hole depth has reached the desired depth set by VL, the comparator 182 generates a limit (i.e., depth limit) signal on line 23 which turns off the laser as indicated by block 179 shown linked to the laser power switch 32.

Figure 5:
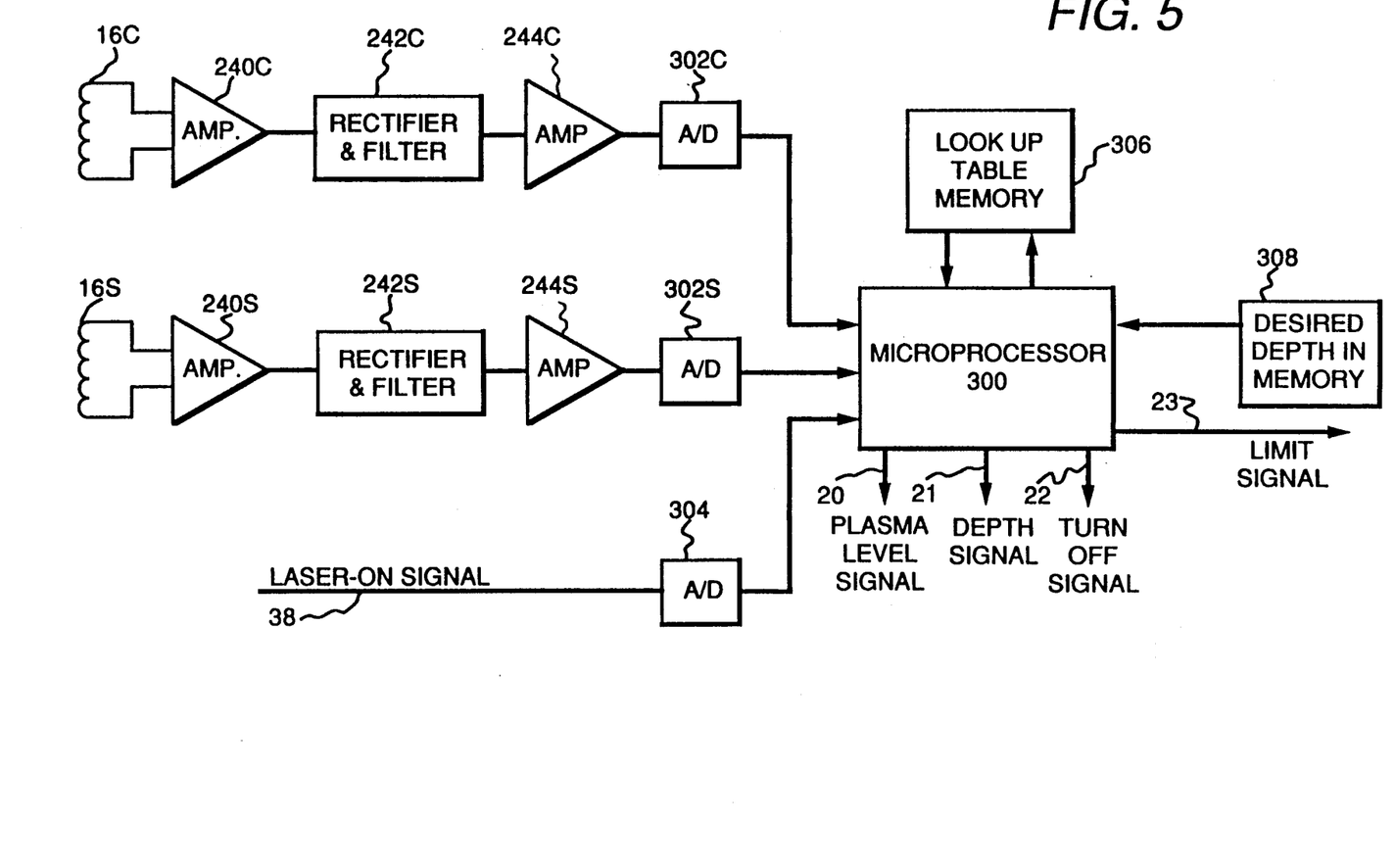
FIG. 5 shows an alternate to the arrangements of FIGS. 2-4 using a microprocessor for all logic and gating functions.

The microprocessor 178 of FIG. 3 is simply used for control of the look up table memory and for comparing the actual depth (i.e., depth signal) to a stored value of desired depth, whereas FIG. 5 shows a more sophisticated use of a microprocessor 300 to replace most of the circuit components of FIGS. 2-4. In FIG. 5, coils 16C and 16S, amplifiers 240C, 240S, 244C, and 244S, and rectifiers (preferably full wave) 242C and 242S operate in the same fashion as the corresponding components of FIG. 2. The outputs of the amplifiers 244C and 244S are respectively fed to the analog to digital converters 302C and 302S, whose outputs are in turn supplied to the microprocessor 300. The microprocessor 300 also receives the laser-on signal by way of A/D convertor 304.

The microprocessor 300 is connected to look up table memory 306 (which is the same in operation and construction as the memory 176 of FIG. 3). The microprocessor would have the desired hole depth stored in memory as indicated by block 308. Memory could be a thumb wheel switch register, RAM, or EEPROM, etc. In addition the desired depth limit could be input via a terminal device. The microprocessor 300 would carry out the various gating, delay, comparison, integration, and signal generation functions of the arrangements of FIGS. 2-4 in order to provide the plasma level, depth, turn off, and limit signals under the same conditions as with the arrangements of FIGS. 2-4. The signals output by microprocessor 300 would be used in the same fashion as described above, either in digital form or after conversion to analog form.

Figure 6:
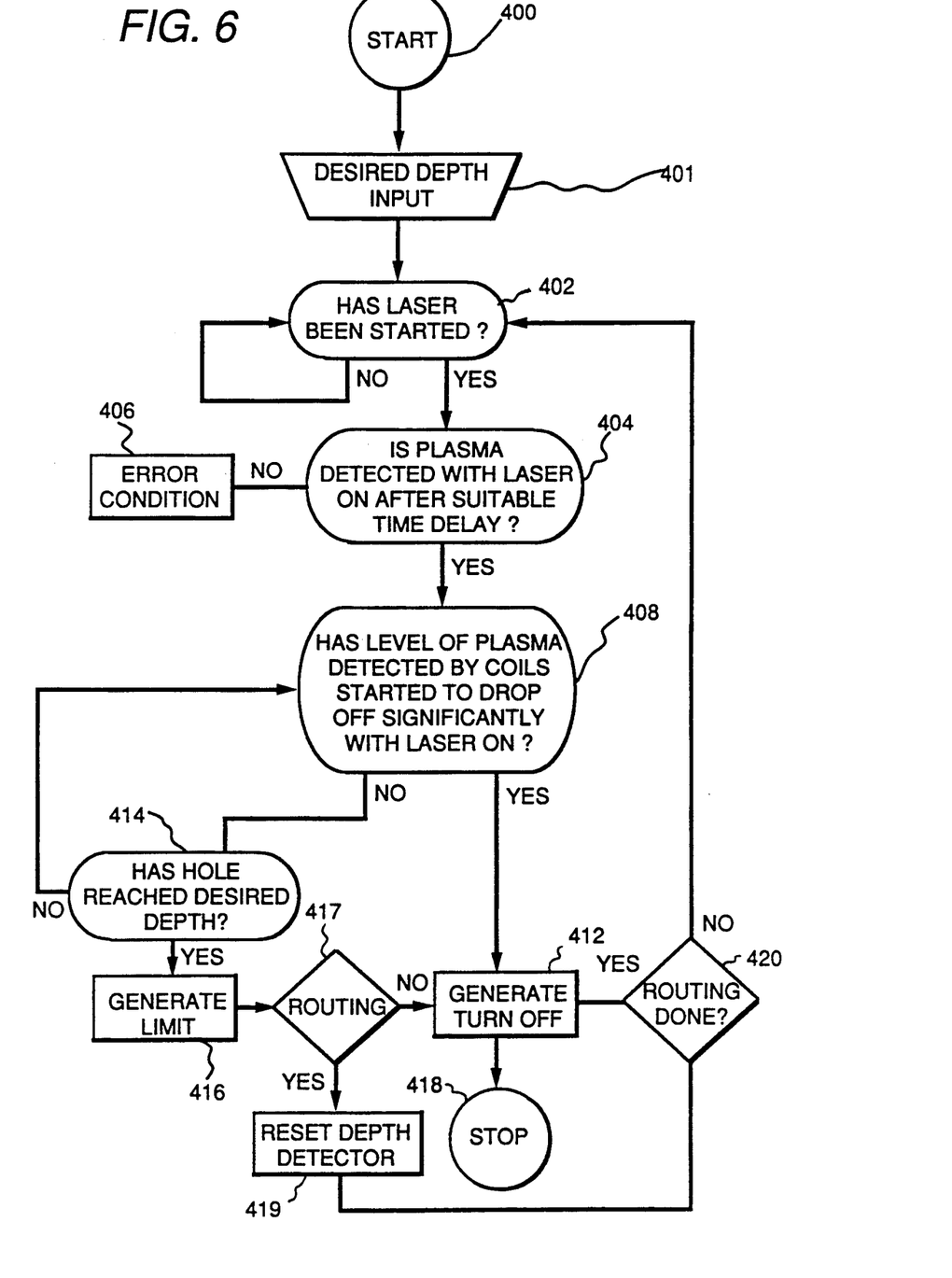
FIG. 6 shows a simplified flow chart illustrating operation of a microprocessor of FIG. 5.

The microprocessor 300 would use the process illustrated by FIG. 6 wherein the start block 400 leads to block 401. Block 401 reads the desired depth and stores this value in internal memory. Block 402 checks to determine if the laser has been started. If not, this is rechecked. If the laser has been started, control transfers to block 404 which tests to determine if plasma is detected. A microprocessor depth detector would determine that by simply looking at the levels of signals received from the coils. As indicated, this test might be delayed shortly to allow sufficient time for the plasma to establish the magnetic fields. If the plasma is not detected, control may transfer optionally to block 406 which indicates an error condition. Alternately, and not shown in the drawing, control could return repeatedly to block 404 for rechecking for the plasma until the plasma is actually detected. At any rate, upon detection of the plasma, block 404 leads to block 408 which checks to determine if the level of plasma detected (which must have been above some threshold to be detected at block 404) has started to decrease significantly in magnitude. (If the laser is a pulsed laser, these checks as well as the checks of block 404 would be made only when the laser is pulsed on). Upon that decrease occurring, control transfers to block 412 which generates the turn off signal. When drilling a blind hole to a precise depth and before any possible breakthrough occurs, block 408 leads to block 414 which determines if the hole has reached the desired depth by comparing the depth signal with the stored value for the desired depth. If the hole has not reached the desired depth, block 414 leads to block 408. If the hole has reached the desired depth, block 414 leads to block 416 which generates a limit signal and progresses to block 417. If this is not a routing process, block 417 leads to block 412. If this is a routing process, block 417 leads to block 419 which resets the depth detector circuit. Block 419 leads to block 402 which continues the routing process. Block 419 leads to block 420 which tests whether the routing process is done. Block 420 leads to block 412 if the routing process is complete and block 402 if the process continues. Block 412 leads to block 418 which stops the process.

When using the system 10 of the present invention, at least one coil such as 16C or 16S would be placed adjacent a surface on a front of a workpiece such as 12. The laser beam from laser 14 is then applied to an application point on the surface to drill a hole in the surface. The beam causes an ionized plasma of particles to escape from the surface. These particles in turn generate a magnetic field. The coil is used to sense the magnetic field and the detector calculates the hole depth using data from the coil (or coils).

Although various details of preferred embodiments in carrying out the invention have been discussed, it is to be understood that these are for illustrative purposes only. Various modifications and adaptations will be readily apparent to those skilled in the art. Another embodiment might be the sampling of peak signals. Accordingly, the scope of the present invention should be determined by reference to the claims appended hereto.

What is claimed is:

1. A method of applying a laser beam to a workpiece comprising the steps of:
   placing at least one magnetic field pick-up coil adjacent to a surface on a front of a workpiece;
   applying a laser beam to an application point on said surface to drill a hole in said surface, said laser beam causing a magnetic field in an ionized plasma of particles escaping from said surface;
   sensing said magnetic field by use of said magnetic field pick-up coil; and
   generating a depth signal representative of the depth of the hole as it is being drilled, the depth signal being dependent on the sensing of the magnetic field.

2. The method of claim 1 wherein said magnetic field pick-up coil extends completely around said laser beam and in a stream of said ionized plasma of particles.

3. The method of claim 1 wherein said magnetic field pick-up coil is to the side of said laser beam and in a stream of said ionized plasma of particles.

4. The method of claim 1 further comprising the steps of comparing the depth of the hole as determined from the depth signal to a desired depth and automatically halting the drilling of the hole when the hole reaches the desired depth.

5. The method of claim 4 wherein the comparing step is accomplished by a comparator.

6. The method of claim 4 wherein the comparing step is accomplished by a microprocessor.

7. The method of claim 4 further comprising the step of generating a plasma level signal dependent on the sensed magnetic field, and wherein the depth signal depends on the plasma level signal taken over time.

8. The method of claim 7 wherein the depth signal depends on the plasma level signal integrated over time.

9. The method of claim 8 wherein the depth signal is generated by a memory having a look-up table, the memory being addressed based upon a value of the plasma level signal integrated over time.

10. The method of claim 7 wherein the depth signal is generated by a memory having a look-up table, the memory being addressed based upon a value of the plasma level signal taken over time.

11. The method of claim 1 further comprising the step of generating a plasma level signal dependent on the sensed magnetic field, and wherein the depth signal depends on the plasma level signal taken over time.

12. The method of claim 11 wherein the placing step includes placing at least two magnetic field pick-up coils adjacent the surface such that the magnetic field of the ionized plasma of particles is sensed by each of the two magnetic field pick-up coils.

13. The method of claim 12 wherein one of said magnetic field pick-up coils is to the side of said laser beam and in a stream of the ionized plasma of particles and the other of said magnetic field pick-up coils extends completely around said laser beam and in a stream the ionized plasma of particles.

14. A system for use when applying a laser beam to a workpiece comprising:
at least one magnetic field pick-up coil for sensing a magnetic field in an ionized plasma of particles and escaping from a workpiece being drilled by a laser beam; and
a depth detector connected to said magnetic field pick-up coil and including means to generate a depth signal representative of the depth of a hole as it is being drilled by a laser, the depth signal being dependent on sensing of magnetic field by the magnetic field pick-up coil.

15. The system of claim 14 further comprising a laser for applying a laser beam to a drill side of a workpiece, and wherein said magnetic field pick-up coil senses the magnetic field when disposed on a drill side of a workpiece.

16. The system of claim 15 wherein two magnetic field pick-up coils are connected to said depth detector.

17. The system of claim 14 wherein said depth detector includes a comparison means for comparing the depth of the hole being drilled with a desired depth, said system further comprising means, responsive to said comparison means, to automatically halt drilling of the hole when the hole reaches the desired depth.

18. The system of claim 17 wherein said depth detector generates a plasma level signal and said means to generate the depth signal includes an integrator to integrate the plasma level signal over time, the depth signal being dependent on the time integral of the plasma level signal.

19. The system of claim 18 wherein said means to generate the depth signal further includes a memory with a look-up table.

20. The system of claim 14 wherein said depth detector generates a plasma level signal and said means to generate the depth signal includes an integrator to integrate the plasma level signal over time, the depth signal being dependent on the time integral of the plasma level signal.

* * * * *